(No Model.)

D. S. SMITH.
MACHINE FOR CLOSING THE CHANNELS IN BOOT AND SHOE SOLES.

No. 268,741. Patented Dec. 5, 1882.

WITNESSES:
Otto Hufeland
William Miller

INVENTOR
Daniel S. Smith
BY Van Santvoord & Hauff
ATTORNEYS

UNITED STATES PATENT OFFICE.

DANIEL S. SMITH, OF ROCKLAND, MASSACHUSETTS, ASSIGNOR TO JOHN K. KRIEG, OF NEW YORK, N. Y.

MACHINE FOR CLOSING THE CHANNELS IN BOOT AND SHOE SOLES.

SPECIFICATION forming part of Letters Patent No. 268,741, dated December 5, 1882.

Application filed September 13, 1882. (No model.)

*To all whom it may concern:*

Be it known that I, DANIEL S. SMITH, a citizen of the United States, residing at Rockland, in the county of Plymouth and State of Massachusetts, have invented new and useful Improvements in Machines for Closing the Channels of Boots and Shoes, of which the following is a specification.

This invention relates to improvements in machines designed for closing the channels in the soles of boots and shoes; and the invention consists in a novel construction and combination of devices, which will be fully hereinafter described, and pointed out in the claims, the object being to provide simple and efficient means whereby the lip may be gradually and rapidly closed into the channel and the sole afterward smoothed.

Figure 1:
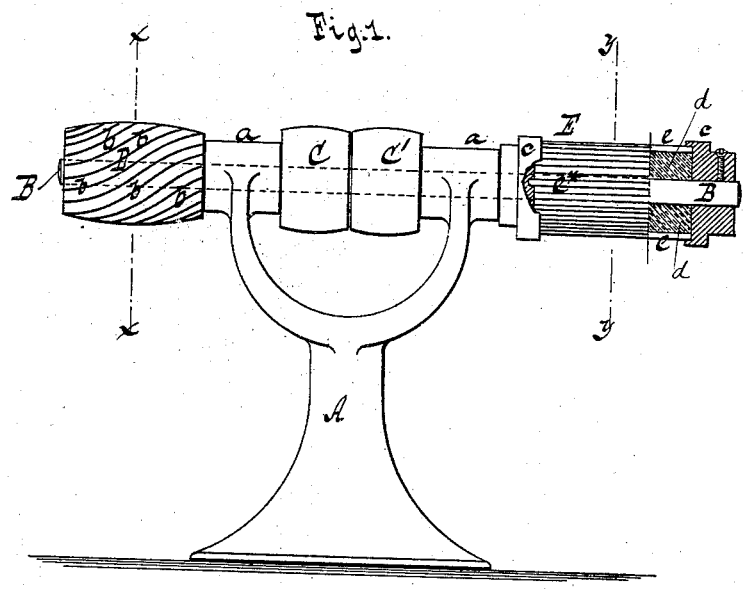
Figure 2:
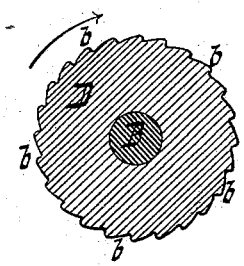
Figure 3:
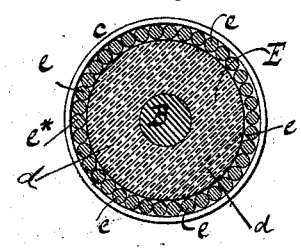

The invention is illustrated in the accompanying drawings, in which Figure 1 represents a sectional side view. Fig. 2 is a transverse section in the plane $x\,x$, Fig. 1, on a larger scale than the previous figure. Fig. 3 is a similar section in the plane $y\,y$, Fig. 1.

Similar letters indicate corresponding parts.

In the drawings, the letter A designates a bifurcated support, the arms $a\,a$ of which form the bearings for a spindle, B. On this spindle, between the arms $a\,a$, are mounted two pulleys, C C′, one fast and the other loose, so that by placing a driving-belt upon the fast pulley a rapid revolving motion can be imparted to the spindle, and by moving the belt from the fast to the loose pulley the motion of the spindle can be stopped. On one end of the spindle B is firmly mounted a head, D, the surface of which is convex in the direction of its axis and provided with a series of spiral ridges, $b\,b$, each of which extends in a uniform path in the direction of the length of the head, and continuously from end to end thereof.

In order to close the channel of a sole, I hold the same up against the surface of the head D, and as this head revolves its spiral ridges act upon the lip of the channel and turn the same down gradually, so as to close the channel with great rapidity. This operation is facilitated by the convex shape of the surface of the head; but the operation may also be accomplished if the head is made in the form of a cylinder with the spiral ridges.

I am aware that a machine has been constructed for this purpose which consists of a head containing a series of pivoted rubbers. In this machine the working-edges of the rubbers run parallel to the axis of the head, and before they can be brought to act upon the lip of the channel this lip must be at least partially turned down over the channel; otherwise said rubbers would be liable to turn the lip of the channel outward instead of inward over the channel. This difficulty is avoided in my machine, since the ridges $b\,b$, on account of their spiral form, act upon the lip of the channel so as to close the same gradually; and they are not liable to turn the lip in the wrong direction, provided the sole is held up against the head in the proper manner. On the opposite end of the spindle B, I have shown a head, E, which may be used to smooth the surface of the sole after the lip has been closed. This head consists of two flanged disks, $c\,c$, between which is situated a packing, $d$, of india-rubber, and a series of metallic anti-friction rollers, $e$, Fig. 3, which rest upon the rubber cushion $d$, and are held in place by the flanges of the disks $c$. One of the rollers, $e^*$, Fig. 1, enters into sockets formed for this purpose in the disks $c$, so that it can freely revolve round its own axis, but not roll on the rubber cushion. This roller prevents also the rolling motion of the remaining rollers, leaving them free, however, to turn on their own axis.

I am aware that a wheel for shaping the edges of boot-heels has been arranged on a vertical shaft to revolve in a horizontal or inclined plane, the surface of the wheel being convex and provided with teeth or serrations; but such a device could not be practically used for the purposes of my invention, as the teeth on the wheel would rasp the lip of the channel, and by casting into the same prevent the lip from being uniformly and gradually closed down over the channel in a perfectly smooth and unbroken condition.

I am further aware that a burnisher-head has been composed of a hollow conical body, which is formed into annular steps of varying diameter, the surface of each step being convex and formed with burnishing-surfaces composed of grooves or corrugations of different widths and sizes; but the construction of such a head would render it unfit for the purposes of my invention, owing to the inconvenience, if not impossibility, of presenting the sole properly to it to produce the uniform, gradual, and rapid turning of the lip over the channel. Besides, the grooves or corrugations composing the burnishing-surfaces would not efficiently perform the functions attained by my uniform and continuous spiral ridges, for the reason that they would tend to upset or batter the lip, catch and tear the same, and prevent the lip from being uniformly turned over the channel in a perfectly smooth condition, which I accomplish by my invention.

What I claim as new, and desire to secure by Letters Patent, is—

1. A sole-channel closing and smoothing apparatus consisting of a horizontal shaft arranged to revolve in a supporting-frame, and provided with the head D, having the series of spiral ridges $b$, for closing the channel of the sole, and with a head, E, composed of a cushion, $d$, a series of rollers, $e$, and disks $c$, retaining the rollers in place for smoothing the sole, substantially as described.

2. The smoothing-head E, composed of flanged disks $c\,c$, a cushion, $d$, of india-rubber or equivalent material, and a series of rollers held between the disks and bearing on the cushion, substantially as described.

In testimony whereof I have hereunto set my hand and seal in the presence of two subscribing witnesses.

DANIEL S. SMITH. [L. S.]

Witnesses:
MATTHEW DOLAN,
H. J. BOARDMAN.